United States Patent
Kim et al.

(10) Patent No.: US 9,756,653 B2
(45) Date of Patent: Sep. 5, 2017

(54) METHOD AND APPARATUS FOR TRANSRECEIVING SCHEDULING REQUEST IN WIRELESS COMMUNICATION SYSTEM

(71) Applicant: Samsung Electronics Co., Ltd, Gyeonggi-do (KR)

(72) Inventors: Sangbum Kim, Gyeonggi-do (KR); Soenghun Kim, Gyeonggi-do (KR); Kyeongin Jeong, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 3 days.

(21) Appl. No.: 14/784,004

(22) PCT Filed: Apr. 11, 2014

(86) PCT No.: PCT/KR2014/003145
§ 371 (c)(1),
(2) Date: Oct. 12, 2015

(87) PCT Pub. No.: WO2014/168449
PCT Pub. Date: Oct. 16, 2014

(65) Prior Publication Data
US 2016/0057767 A1 Feb. 25, 2016

(30) Foreign Application Priority Data
Apr. 11, 2013 (KR) .......... 10-2013-0040034

(51) Int. Cl.
*H04W 72/04* (2009.01)
*H04W 72/12* (2009.01)
(Continued)

(52) U.S. Cl.
CPC ....... *H04W 72/1263* (2013.01); *H04W 24/10* (2013.01); *H04W 72/1278* (2013.01); *H04W 74/0833* (2013.01)

(58) Field of Classification Search
CPC ......... H04W 72/1263; H04W 72/1278; H04W 74/1278; H04W 24/10
(Continued)

(56) References Cited

U.S. PATENT DOCUMENTS

2003/0118123 A1 6/2003 Hudson et al.
2005/0243761 A1 11/2005 Terry et al.
(Continued)

FOREIGN PATENT DOCUMENTS

KR 10-2007-0092165 9/2007
KR 2007-0092165 * 9/2007
(Continued)

OTHER PUBLICATIONS

International Search Report dated Jul. 28, 2014 in connection with International Patent Application No. PCT/KR2014/003145, 7 pages.
(Continued)

*Primary Examiner* — Afsar M Qureshi (57) ABSTRACT

Provided are a method and apparatus that enable a user equipment to record and report measurement information regarding scheduling requests and subscription traffic limitations. More specifically, a method of transmitting a scheduling request (SR) for a user equipment (UE) in a wireless communication system may include: receiving configuration information for SR transmission information from a base station (eNB); sending, when data to be sent is generated, an SR to the eNB; resending, when scheduling information is not received from the eNB within a preset time duration, the SR to the eNB, and recording information on SR transmission; and sending, when scheduling information is received from the eNB, the SR transmission information to the eNB in accordance with the scheduling information.

20 Claims, 11 Drawing Sheets (51) Int. Cl.
*H04W 24/10* (2009.01)
*H04W 74/08* (2009.01)

(58) Field of Classification Search
USPC .......................................................... 370/329
See application file for complete search history.

(56) References Cited

U.S. PATENT DOCUMENTS

| | | |
|---|---|---|
| 2007/0211663 A1 | 9/2007 | Jiang |
| 2009/0135779 A1 | 5/2009 | Moon et al. |
| 2009/0138598 A1* | 5/2009 | Shrivastava .......... H04L 5/0091 709/226 |
| 2011/0194441 A1 | 8/2011 | Jung et al. |
| 2013/0163535 A1* | 6/2013 | Anderson ............. H04W 72/04 370/329 |
| 2013/0246584 A1* | 9/2013 | Barton .................. H04L 67/325 709/219 |
| 2014/0056243 A1* | 2/2014 | Pelletier ................ H04W 74/04 370/329 |
| 2014/0135027 A1* | 5/2014 | Kodali ............. H04W 72/1278 455/452.1 |
| 2015/0006841 A1* | 1/2015 | Chen .................... G06F 13/4239 711/167 |
| 2015/0085723 A1* | 3/2015 | Chen .................... H04W 72/042 370/280 |
| 2015/0156766 A1* | 6/2015 | Xu ........................ H04L 5/0032 370/252 |
| 2015/0223228 A1* | 8/2015 | Rune ................. H04W 72/1278 370/311 |
| 2016/0198457 A1* | 7/2016 | Chu ....................... H04W 72/12 370/329 |

FOREIGN PATENT DOCUMENTS

| | | |
|---|---|---|
| KR | 10-2009-0054207 | 5/2009 |
| KR | 10-1146868 | 5/2012 |
| WO | WO 03/056774 A1 | 7/2003 |

OTHER PUBLICATIONS

Written Opinion of the International Searching Authority dated Jul. 28, 2014 in connection with International Patent Application No. PCT/KR2014/003145, 6 pages.

* cited by examiner

METHOD AND APPARATUS FOR TRANSRECEIVING SCHEDULING REQUEST IN WIRELESS COMMUNICATION SYSTEM

CROSS-REFERENCE TO RELATED APPLICATION(S)

The present application claims priority under 35 U.S.C. §365 to International Patent Application No. PCT/KR2014/003145 filed Apr. 11, 2014, entitled "METHOD AND APPARATUS FOR TRANSCEIVING SCHEDULING REQUEST IN WIRELESS COMMUNICATION SYSTEM", and, through International Patent Application No. PCT/KR2014/003145, to Korean Patent Application No. 10-2013-0040034 filed Apr. 11, 2013, each of which are incorporated herein by reference into the present disclosure as if fully set forth herein.

TECHNICAL FIELD

The present invention relates to a wireless communication system and, more particularly, to a method and apparatus for sending and receiving scheduling requests in a wireless communication system.

BACKGROUND ART

In general, mobile communication systems have been developed to provide communication services while guaranteeing user mobility. Thanks to rapid technological advancement, mobile communication systems are capable of providing not only voice communication services but also high-speed data communication services.

In recent years, the 3rd Generation Partnership Project (3GPP) has been working to standardize specifications for the Long Term Evolution (LTE) system as a next generation mobile communication system. The LTE system aims to realize high-speed packet based communication supporting a data rate of about 100 Mbps exceeding existing data rates. To achieve this, various approaches have been considered, such as reducing the number of nodes on a communication path through simplification of the network architecture and bringing wireless protocols as close as possible to wireless channels.

Meanwhile, in a data service, unlike a voice service, allocable resources are determined according to the amount of data to be sent and channel conditions. As such, in a wireless communication system such as a mobile communication system, the scheduler manages or allocates transmission resources in consideration of the amount of transmission resources, channel conditions, and the amount of data. This applies also to the LTE system viewed as a next generation mobile communication system, where the scheduler placed at the base station manages and allocates radio transmission resources.

When data to be sent to the base station is generated, the user equipment sends a scheduling request for necessary resources to the base station. Here, transmission of the scheduling request may succeed or fail.

Currently, when transmission of a scheduling request fails, the user equipment tends not to record the procedure of sending the scheduling request and the base station is unaware of this failure, making it difficult to efficiently manage radio resources.

DISCLOSURE OF INVENTION

Technical Problem

The present invention has been made in view of the above problems. Accordingly, an aspect of the present invention is to provide a method and apparatus that enable a user equipment transmitting a scheduling request to record information on transmission of scheduling requests and to report the recorded information to the base station, so that radio resources can be efficiently managed.

Solution to Problem

In accordance with an aspect of the present invention, there is provided a method of transmitting a scheduling request (SR) for a user equipment (UE) in a wireless communication system. The method may include: receiving configuration information for SR transmission information from a base station (eNB); sending, when data to be sent is generated, an SR to the eNB; resending, when scheduling information is not received from the eNB within a preset time duration, the SR to the eNB, and recording information on SR transmission; and sending, when scheduling information is received from the eNB, the SR transmission information to the eNB in accordance with the scheduling information.

In accordance with another aspect of the present invention, there is provided a user equipment (UE) capable of transmitting a scheduling request (SR) in a wireless communication system. The user equipment may include: a transceiver unit to send and receive signals to and from a base station (eNB); and a control unit to control a process of receiving configuration information for SR transmission information from an eNB, sending, when data to be sent is generated, an SR to the eNB, resending, when scheduling information is not received from the eNB within a preset time duration, the SR to the eNB and recording information on SR transmission, and sending, when scheduling information is received from the eNB, the SR transmission information to the eNB in accordance with the scheduling information.

In accordance with another aspect of the present invention, there is provided a method of receiving a scheduling request (SR) for a base station (eNB) in a wireless communication system. The method may include: sending configuration information for SR transmission information to a user equipment (UE); sending, when an SR is received from the UE, scheduling information to the UE; and receiving SR transmission information from the UE.

In accordance with another aspect of the present invention, there is provided a base station (eNB) capable of receiving a scheduling request (SR) in a wireless communication system. The base station may include: a transceiver unit to send and receive signals to and from a user equipment (UE); and a control unit to control a process of sending configuration information for SR transmission information to a UE, sending, when an SR is received from the UE, scheduling information to the UE, and receiving SR transmission information from the UE.

Advantageous Effects of Invention

In a feature of the present invention, when a scheduling request is transmitted, the user equipment records information on transmission of the scheduling request and reports the recorded information to the base station. Hence, it is possible to efficiently manage radio resources.

MODE FOR THE INVENTION

Hereinafter, preferred embodiments of the present invention are described in detail with reference to the accompanying drawings. The same or similar reference symbols are used throughout the drawings to refer to the same or like parts. Detailed descriptions of well-known functions and structures incorporated herein may be omitted to avoid obscuring the subject matter of the present invention.

The following description of embodiments of the present invention is focused on the LTE system. However, it should be understood by those skilled in the art that the subject matter of the present invention is applicable to other communication systems having similar technical backgrounds and channel configurations without significant modifications departing from the scope of the present invention. In the following description, the terms "base station" and "eNB" may be used interchangeably.

The present invention relates to a method and apparatus that enable a user equipment to record and report information on scheduling requests (SRs) and measurements related to the subscription traffic limitation.

More specifically, the first embodiment relates to a procedure whereby the user equipment collects SR-related information and reports the collected information to the base station, and the second embodiment relates to a procedure whereby the base station collects information regarding subscription traffic limitations and UE throughput and reports the collected information to the Trace Collection Entity (TCE) server.

Embodiment 1

The first embodiment relates to a procedure whereby the user equipment collects information on SR transmission and reports the collected information to the base station.

To request allocation of resources needed to transmit a Buffer Status Report (BSR), the user equipment sends an SR to the base station via the Physical Uplink Control Channel (PUCCH).

SR transmission may fail according to channel conditions. When necessary resources are not allocated after a preset number of transmission attempts, the user equipment performs the Random Access (RA) procedure. When PUCCH allocation fails, the user equipment also performs the RA procedure.

In this case, if the user equipment provides information on SR transmission (e.g. the number of attempts for SR transmission) to the base station, the base station may use this information for efficient utilization of radio resources and optimization of the service area.

As such, in the first embodiment, useful SR related information is identified and a scheme is proposed to report such information to the base station.

Figure 1:
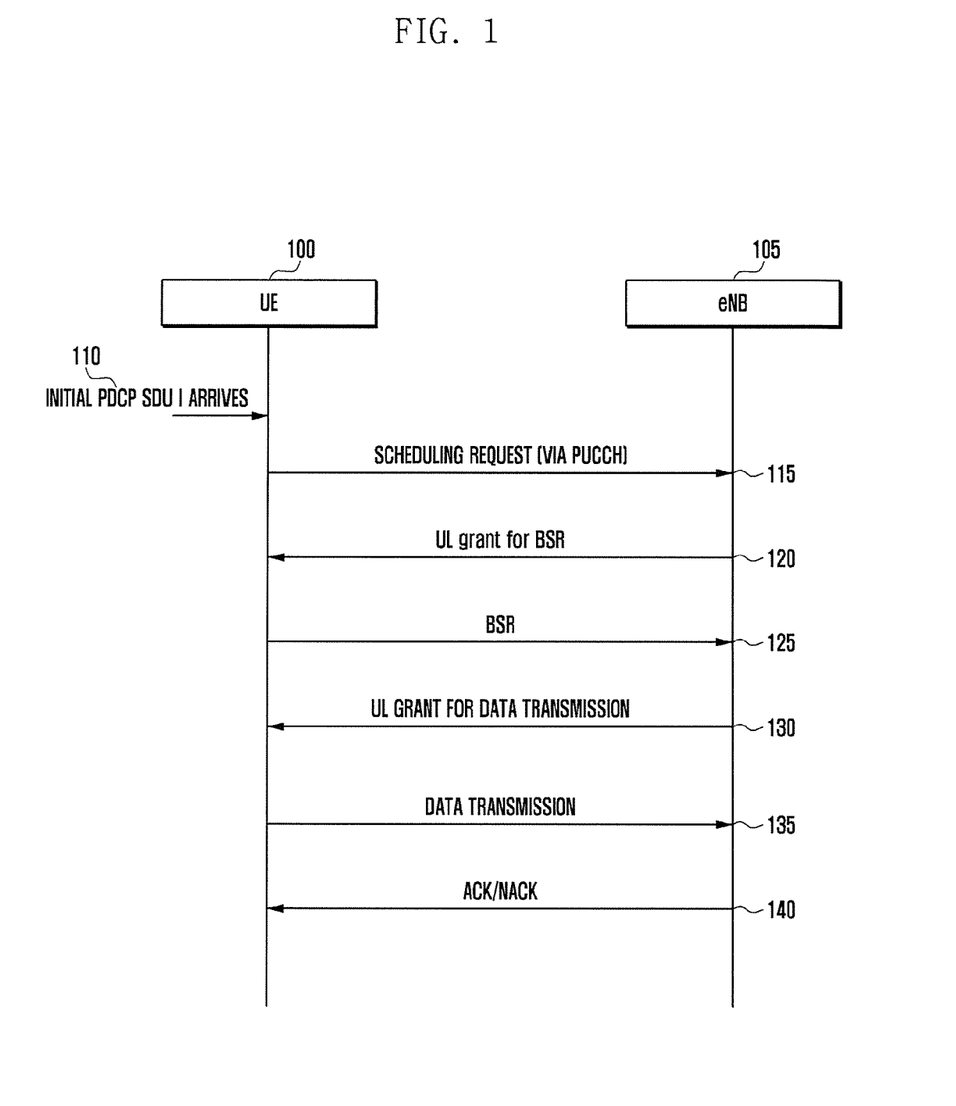
FIG. 1 depicts a procedure whereby a user equipment sends a scheduling request to a base station to receive radio resource allocation.

FIG. 1 depicts a procedure whereby a user equipment sends a scheduling request to a base station to receive radio resource allocation.

At step 110, a data packet to be sent (PDCP SDU—Packet Data Convergence Protocol Service Data Unit) is generated at the UE 100.

At step 115, the UE determines presence of radio resources usable to send the data. If such radio resources are not present, the UE checks whether the PUCCH is allocated. If the PUCCH is allocated, the UE sends a scheduling request (SR) to the eNB 105.

Upon reception of the scheduling request, at step 120, the eNB schedules radio resources usable for BSR transmission for the UE. The BSR is used by the UE to notify the eNB of the amount of data to be sent.

At step 125, the UE sends a BSR by use of the allocated radio resource. At step 130, the eNB allocates radio resources usable to transmit the PDCP SDU. At step 135, the UE sends PDCP SDU data to the eNB. At step 140, the eNB sends ACK/NACK information corresponding to the received data.

Figure 2:
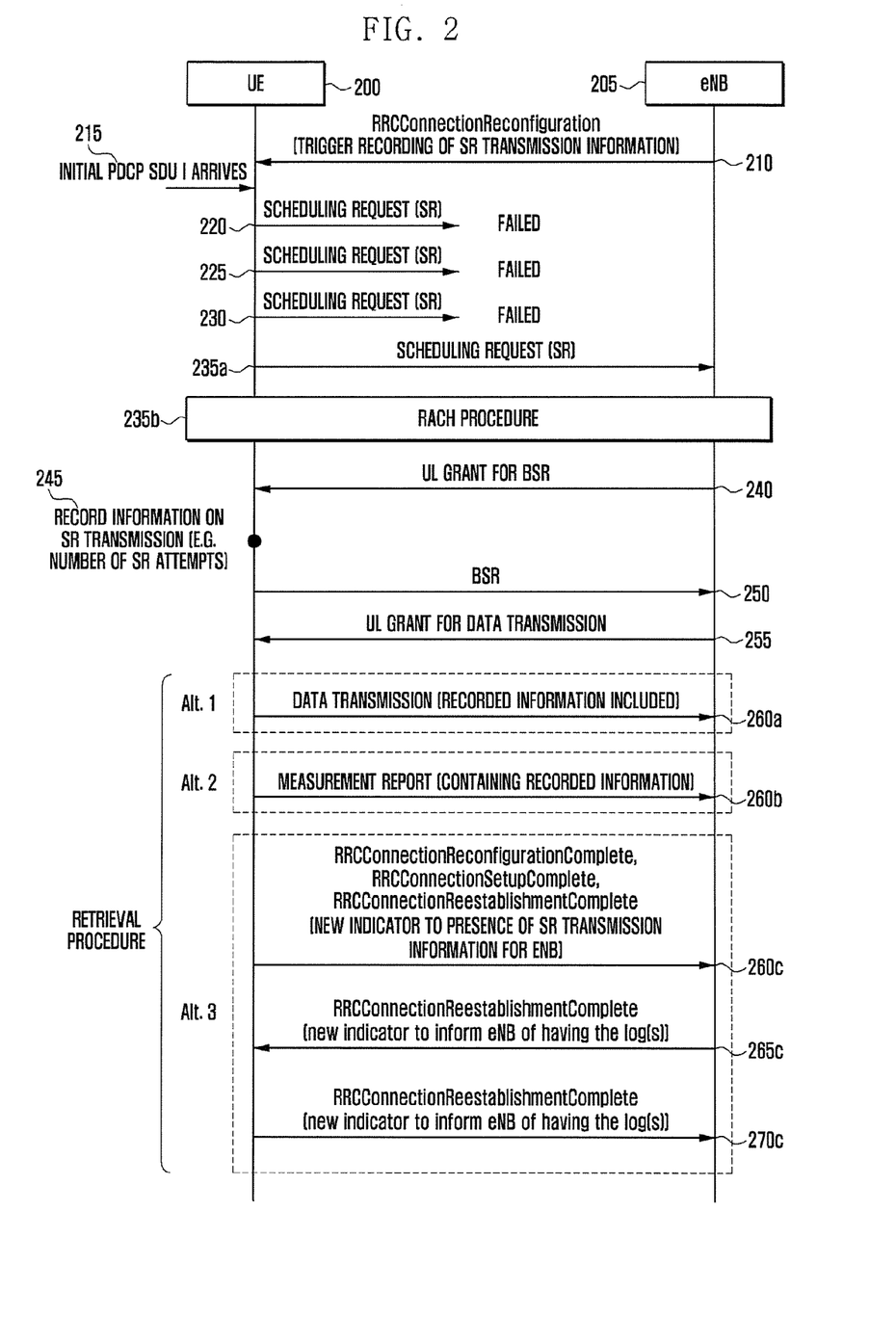
FIG. 2 is a sequence diagram illustrating a first embodiment of the present invention.

FIG. 2 is a sequence diagram illustrating the first embodiment of the present invention.

At step 210, the eNB 205 sends the UE 200 configuration information indicating collection and reporting of SR related information. This configuration information may be sent via an RRCconnectionReconfiguration message.

At step 215, the UE detects generation of a PDCP SDU to be sent. At step 220, the UE determines presence of radio resources usable to send the data.

If such radio resources are not present, the UE checks whether the PUCCH is allocated. If the PUCCH is allocated, the UE sends a scheduling request to the eNB via the PUCCH. If scheduling information is not received from the eNB within a preset time duration, the UE repeatedly makes an SR retransmission attempt at step 225 and at step 230.

If the scheduling request is successfully sent to the eNB at step 235a or SR transmission has failed after a preset number of retransmissions, at step 235b, the UE may perform the RA procedure. When scheduling information for BSR transmission is received at step 240, at step 245, the UE records information on SR transmission.

The information on SR transmission may include at least one of information items listed below.

Number of SR Trials

The number of attempts made to transmit an SR

RACH Fallback Indication

RA attempt due to absence of available PUCCH or excess of SR trials

PUCCH Transmission Power/Power Headroom

Information on PUCCH transmission power or UE power headroom (transmission power available to UE). This may be information on a specific point in time of SR transmission (e.g. initial SR transmission time, last SR transmission time, or average of all SR transmission times).

Timestamps (Time from the First Trial to Report or Time from the Last Trial to Report)

Absolute time of the first trial or last trial, time from the first or last trial to report, time taken to record SR information, or the like UE Location (e.g. GNSS Location, RF Fingerprint)

Location information of UE when SR information is recorded.

Timestamp to Obtain GNSS Location Information

The time when GNSS information is obtained if it is to be recorded as UE location information.

At step 250, the UE sends a BSR by use of radio resources allocated at step 240.

At step 255, the eNB allocates radio resources to be used for PDCP SDU transmission.

There may be several ways to report the recorded SR transmission information to the eNB.

A first option is use a Medium Access Control (MAC) Control Element (CE) to report SR transmission information to the eNB. At step 260a, the UE may create a new MAC CE containing SR transmission information and send the MAC CE to the eNB.

Figure 4:
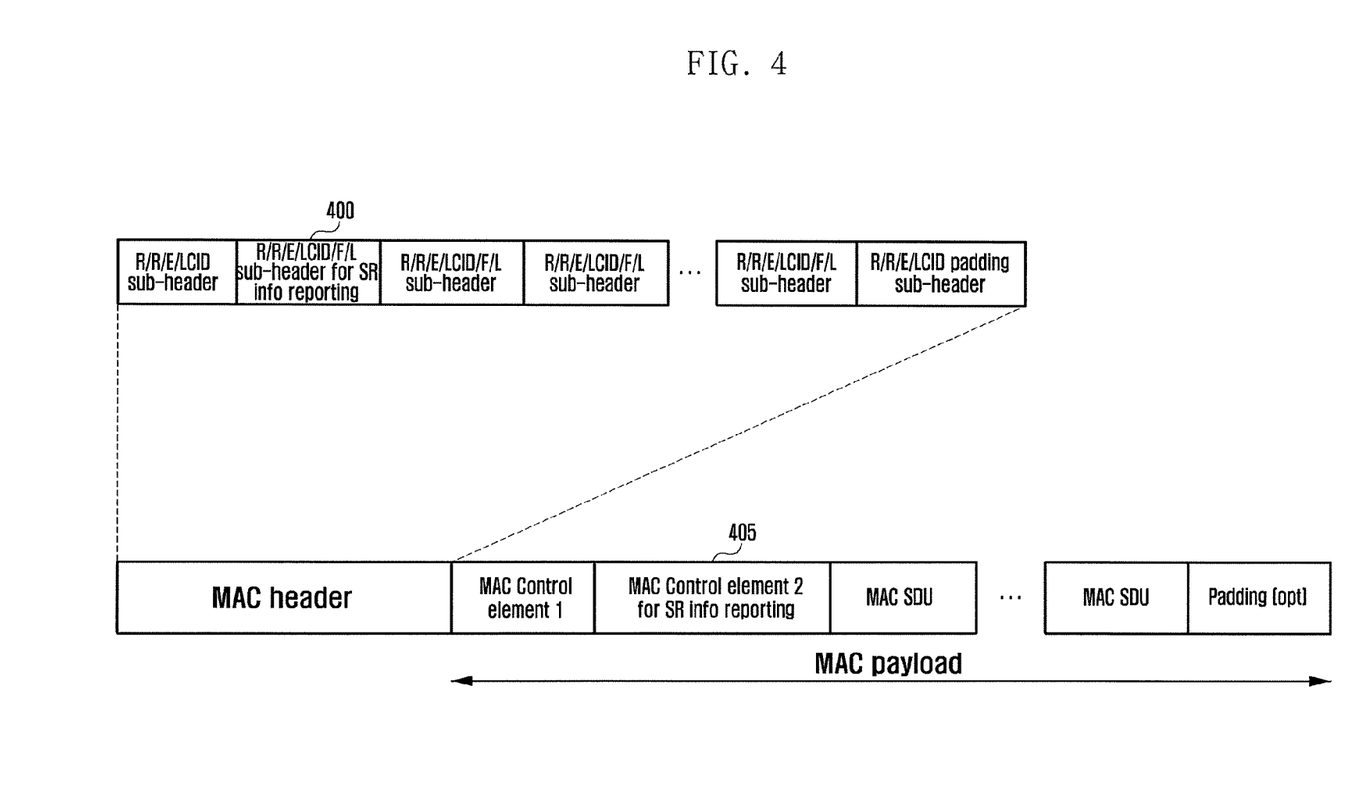
FIG. 4 illustrates the MAC PDU format for MAC CE containing SR related information.

FIG. 4 illustrates a MAC PDU having such a MAC CE. A MAC sub-header 400 indicating the MAC CE 405 is included in the MAC header. In the MAC sub-header 400, a new LCID (Logical Channel ID) is defined to identify the MAC CE containing SR transmission information. The MAC CE 405 is included in the MAC payload, and the MAC CE 405 may contain at least one of the information items listed above.

A second option is to use an existing measurement report to report SR transmission information to the eNB. At step 260a, the UE may send a measurement report containing SR transmission information to the eNB.

In a third option to report SR transmission information, the UE uses a specific higher layer message (e.g. RRC message) to notify the eNB of presence of SR transmission information, and the eNB receives the SR transmission information via exchange of UE information request and response messages.

Here, examples of such an RRC message may include the RRCConnectionReconfigurationComplete message, RRC-ConnectionSetupComplete message, and RRCConnection-ReestablishmentComplete message.

UE information may be exchanged through a UE information request message and UE information response message. More specifically, the eNB may use a UE information request message to request the UE to report SR transmission information, and the UE may use a UE information response message to report the SR transmission information.

Figure 3:
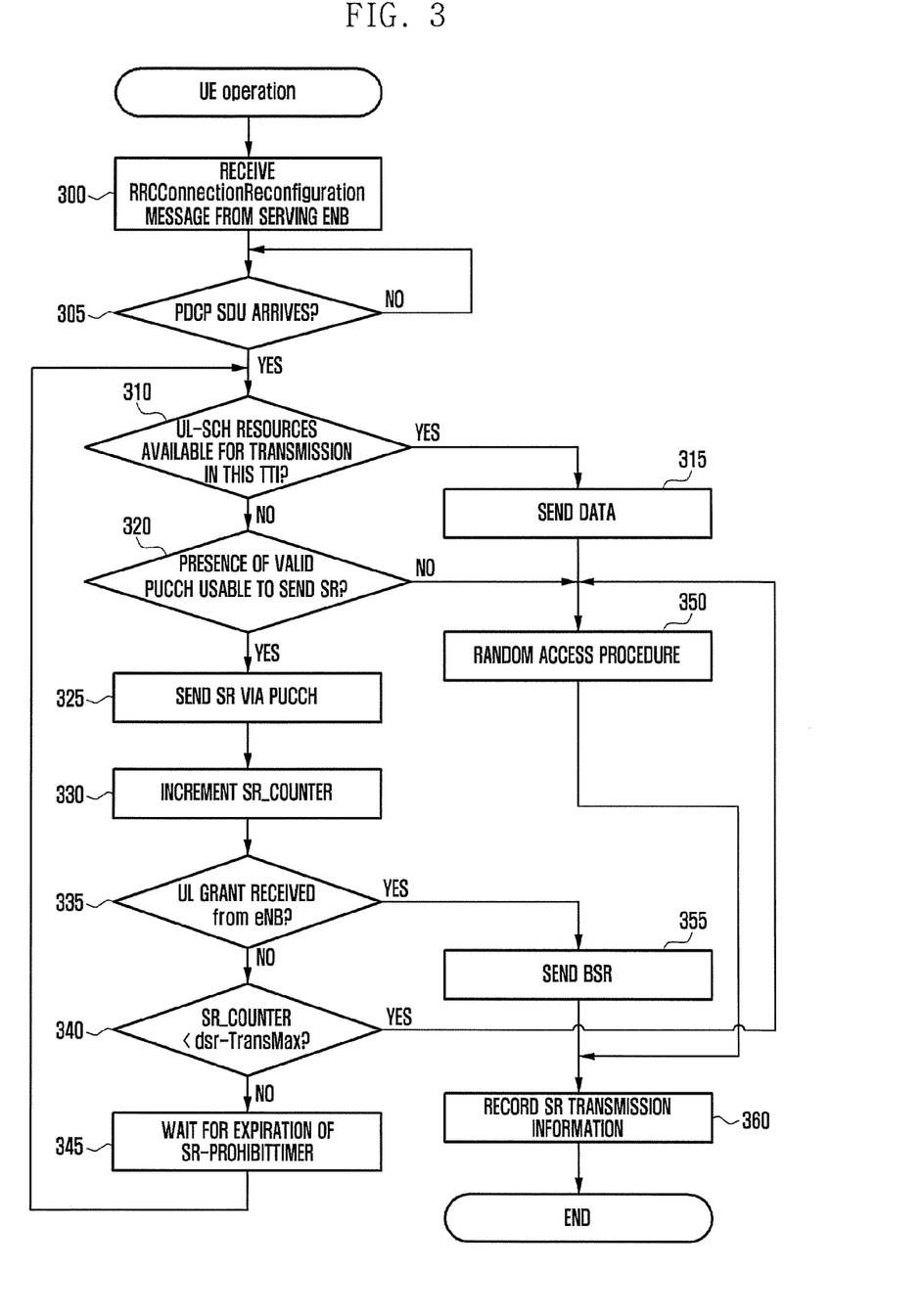
FIG. 3 illustrates UE operations in the first embodiment.

FIG. 3 is a flowchart for UE operations according to the first embodiment of the present invention.

At step 300, the UE receives an RRC message indicating configuration for collecting and reporting SR transmission information from the eNB. At step 305, the UE checks generation of a PDCP SDU to be sent.

If a PDCP SDU is generated, at step 310, the UE checks availability of an uplink resource usable to send the data or BSR. If an uplink resource is available, at step 315, the UE sends the data.

If an uplink resource usable to send the BSR is not available, at step 320, the UE checks presence of a valid PUCCH usable to send an SR. If a valid PUCCH is not present, the UE performs the RA procedure at step 350 to obtain UL grant (scheduling information for uplink data) and records SR transmission information at step 360.

If a valid PUCCH is present at step 320, at step 325, the UE transmits an SR through the PUCCH.

At step 330, the UE increases SR_COUNTER by 1. At step 335, the UE checks reception of scheduling information from the eNB. If scheduling information is received, the UE transmits a BSR according to the scheduling information at step 355 and records SR transmission information at step 360.

If scheduling information is not received, at step 340, the UE checks whether SR_COUNTER is less than dsr-TransMax. Here, dsr-TransMax indicates the maximum number of SR transmissions allowed for the UE, and may be signaled from the eNB. If SR_COUNTER is greater than or equal to dsr-TransMax, at step 345, the UE waits for expiration of sr-ProhibitTimer as SR transmission is not allowed while sr-ProhibitTimer is running, and then returns to step 310. If SR_COUNTER is less than dsr-TransMax, the UE proceeds to step 350 and records SR transmission information at step 360.

Embodiment 2

The second embodiment relates to a procedure whereby the base station collects information regarding subscription traffic limitations and UE throughput and reports the collected information to the TCE server.

In LTE, transmission throughput of a UE may be limited by not only channel conditions but also subscription information. That is, the maximum transmission throughput of a UE may be limited according to user agreements. Such subscription limitations may be imposed on a bearer basis, on a UE basis or on an APN basis.

Figure 5:
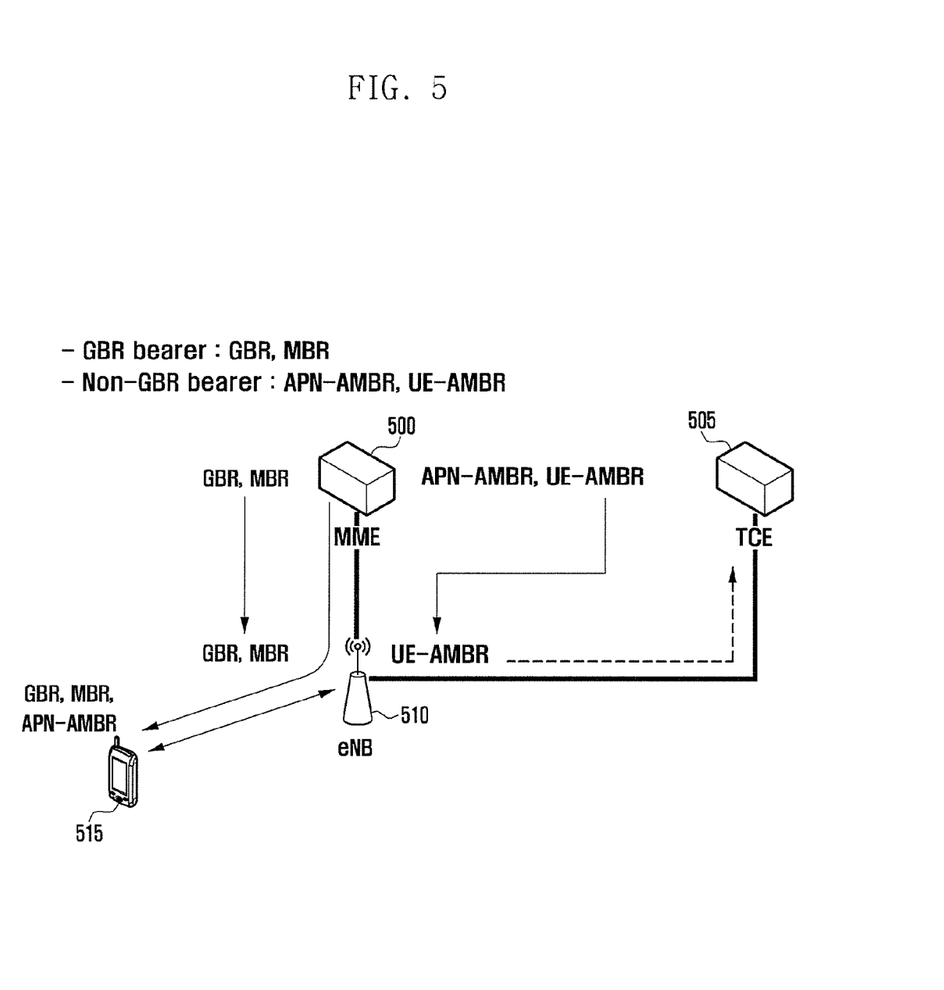
FIG. 5 illustrates restrictions on throughput according to UE subscription.

FIG. 5 illustrates restrictions on throughput according to UE subscription.

As shown in FIG. 5, bearers may be largely divided into GBR (guaranteed bit rate) bearers and non-GBR bearers. A GBR bearer has a minimum guaranteed bit rate. A bearer may be associated with two subscription parameters: GBR and MBR (described below). The MME 500 notifies the eNB 510 and UE 515 of the GBR and MBR parameters. As such, the MME, eNB and UE are aware of the GBR and MBR parameters.

GBR (guaranteed bit rate, used for applications such as VoIP): the minimum guaranteed bit rate for a GBR bearer MBR (maximum bit rate): the maximum allowed bit rate for a GBR bearer (optional)

A non-GBR bearer may be associated with two subscription parameters: APN-AMBR and UE-AMBR. The MME 500 computes UE-AMBR using APN-AMBR and notifies the eNB 510 of UE-AMBR. As such, the eNB is unaware of APN-AMBR and is aware of UE-AMBR. APN is a logical label corresponding to a PDN (Packet Data Network) connection such as the Internet or VoIP.

APN-AMBR (Access Point Name Aggregate Maximum Bit Rate): a subscription parameter indicating the aggregate bit rate that can be expected to be provided across all non-GBR bearers and across all PDN connections of the same APN.

UE-AMBR (UE Aggregate Maximum Bit Rate): a sum of the APN-AMBR of all active APNs, and cannot exceed the subscribed UE-AMBR.

According to the current LTE standards, the eNB may collect information on UE throughput and report the collected information to the TCE server 505 for the purpose of MDT.

Throughput information to be collected is specified in the LTE standards. For the downlink, information on per-UE throughput and information on per-RAB throughput are collected. Information on per-RAB throughput is collected together with Quality Class Identifier (QCI) applied to the corresponding RAB. For the uplink, information on per-UE throughput is collected.

If the TCE server can identify whether the throughput is limited by channel conditions or by UE subscription parameters, this may contribute to efficient management of radio resources and optimization of service areas.

However, as the eNB has information only on MBR and UE-AMBR, subscription parameters that can be forwarded to the TCE server together with collected throughput information are MBR and UE-AMBR only.

If the eNB forwards UE-AMBR together with collected throughput information to the TCE server, the network operator having obtained such information via the TCE server may only identify whether downlink per-UE throughput for a non-GBR bearer is limited by UE-AMBR.

However, the actual throughput may be limited by many other subscription parameters.

The present invention proposes a scheme that enables the network operator to identify whether the throughput is limited by UE subscription parameters. In the following description, uplink and downlink cases are considered separately.

For the downlink, by use of information collected at the TCE server, the network operator may identify throughput limitations due to the following subscription parameters.

Whether total DL throughput per UE is limited by UE-AMBR

Whether APN throughput per UE is limited by APN-AMBR

Whether throughput per GBR bearer is limited by MBR

To this end, the eNB forwards both the throughput information described before and the following information items to the TCE server.

UE-AMBR

APN-AMBR

APN information for each RAB: this indicates the APN to which each RAB belongs. For all RABs belonging to one APN, the throughput is summed and is compared with the corresponding APN-AMBR.

MBR for each RAB

Figure 6:
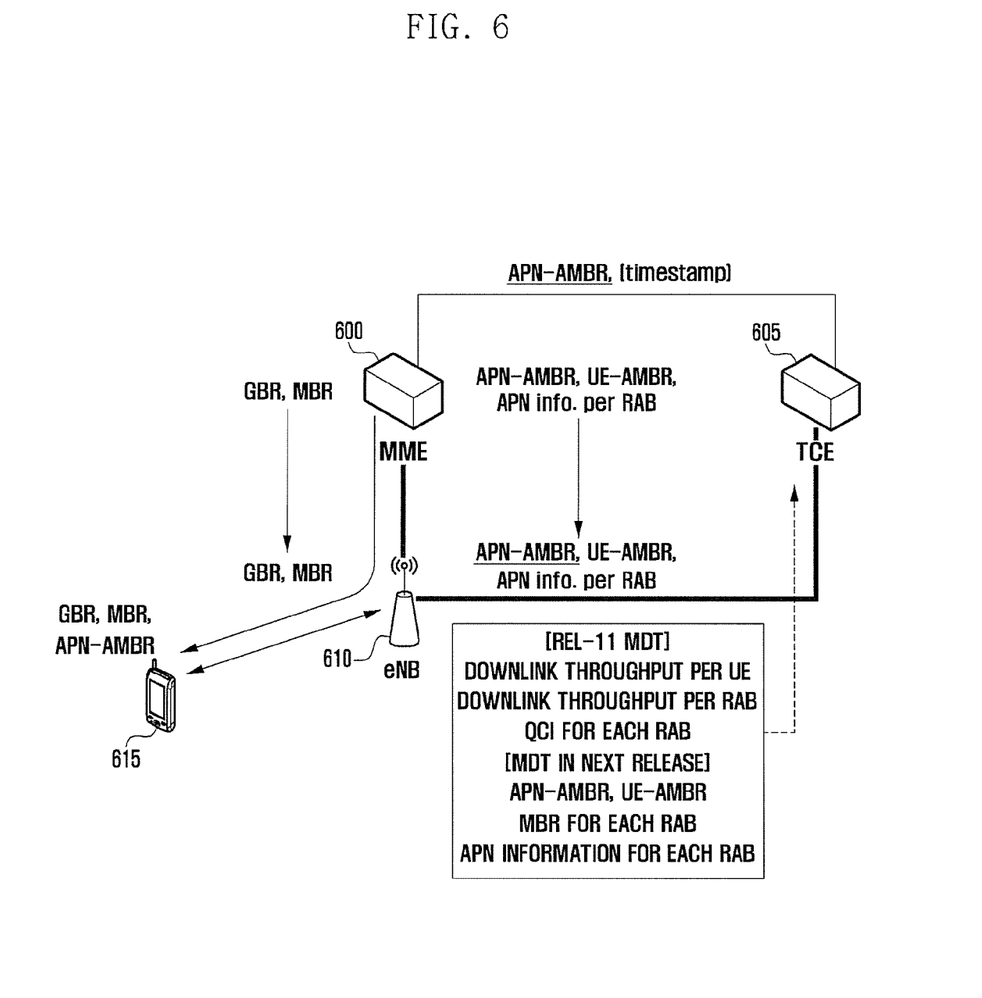
FIG. 6 illustrates identification of restrictions on downlink throughput placed by UE subscription parameters.

FIG. 6 illustrates identification of restrictions on downlink throughput placed by UE subscription parameters.

The MME 600 provides the eNB 610 with APN-AMBR and APN information for each RAB in addition to GBR, MBR and UE-AMBR.

The eNB may forward not only collected downlink throughput information but also MBR per RAB, UE-AMBR, APN-AMBR and APN information for each RAB to the TCE server 605.

Alternatively, the MME may directly deliver the above information (GBR, MBR, UE-AMBR, APN-AMBR and APN information for each RAB) to the TCE server. Here, the TCE server may have to associate the above information with throughput information from the eNB. To this end, the MME may also provide UE ID and timing information to the TCE server.

Figure 7:
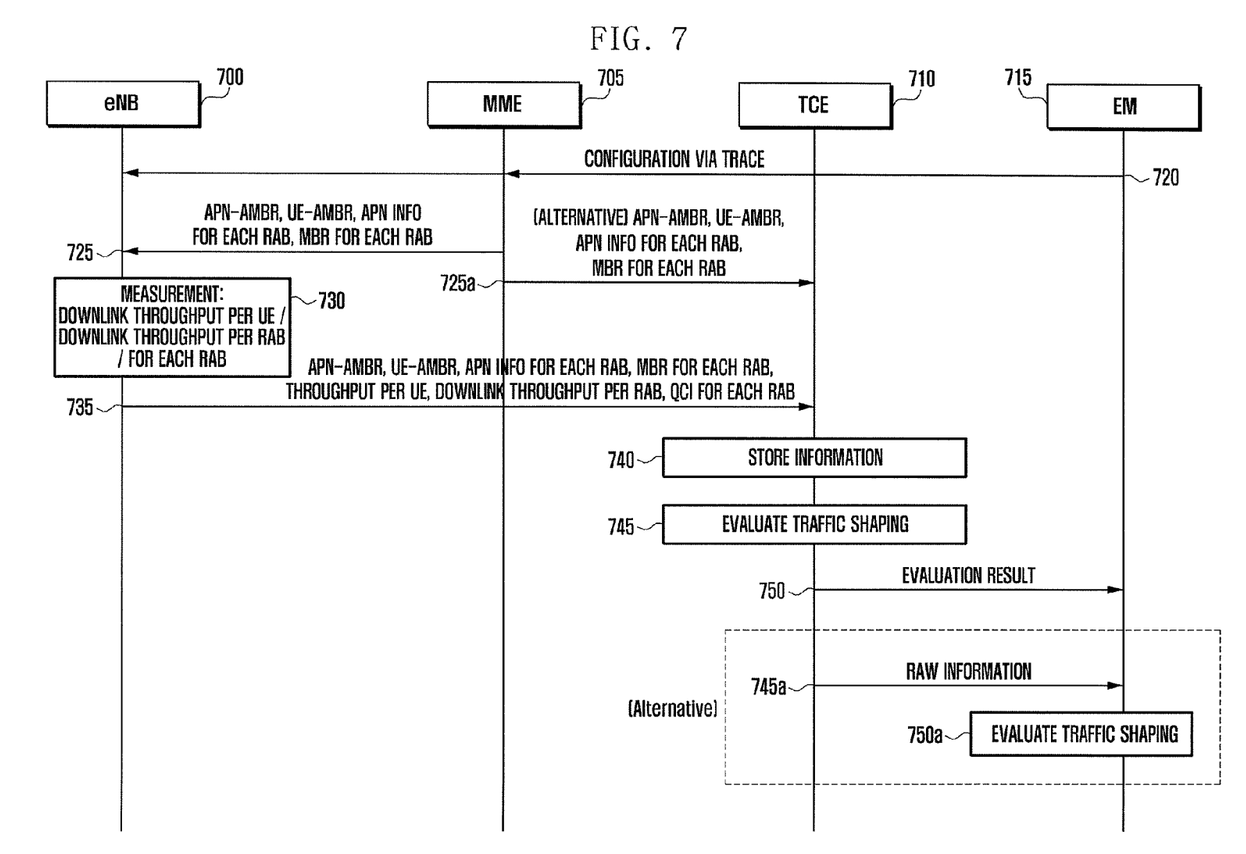
FIG. 7 is a sequence diagram illustrating delivery of information regarding downlink throughput and UE subscription parameters to the TCE server.

FIG. 7 is a sequence diagram illustrating delivery of information regarding downlink throughput and UE subscription parameters to the TCE server.

At step 720, the Element Manager (EM) 715 signals configuration of information collection and reporting to the eNB 700 and MME 705.

At step 725, the MME sends MBR per RAB, UE-AMBR, APN-AMBR, and APN information for each RAB to the eNB.

As an alternative described before, at step 725a, the MME may directly send UE subscription parameters to the TCE server 710. Here, to map the above information with throughput information from the eNB, the MME may also provide UE ID and timing information for the subscription parameters to the TCE server.

At step 730, the eNB measures the throughput according to the existing scheme. At step 735, the eNB forwards both the UE subscription parameters received from the MME and measured throughput information to the TCE server. Here, the timing for forwarding is an issue of eNB implementation, and it is assumed that the subscription information and the throughput information are coupled together automatically.

At step 740, the TCE server stores the received information, which may be used to identify the cause of throughput limitation. Such identification or evaluation may be performed by the TCE server as indicated by step 745, or performed separately by the network operator as indicated by step 750a.

When the TCE server performs identification or evaluation at step 745, at step 750, it sends the evaluation result to the network operator. Alternatively, when the network operator performs identification or evaluation using a separate entity, the TCE server sends the stored information as raw information to the network operator at step 745a, and the network operator evaluates the received information using a separate entity at step 750a.

Figure 8:
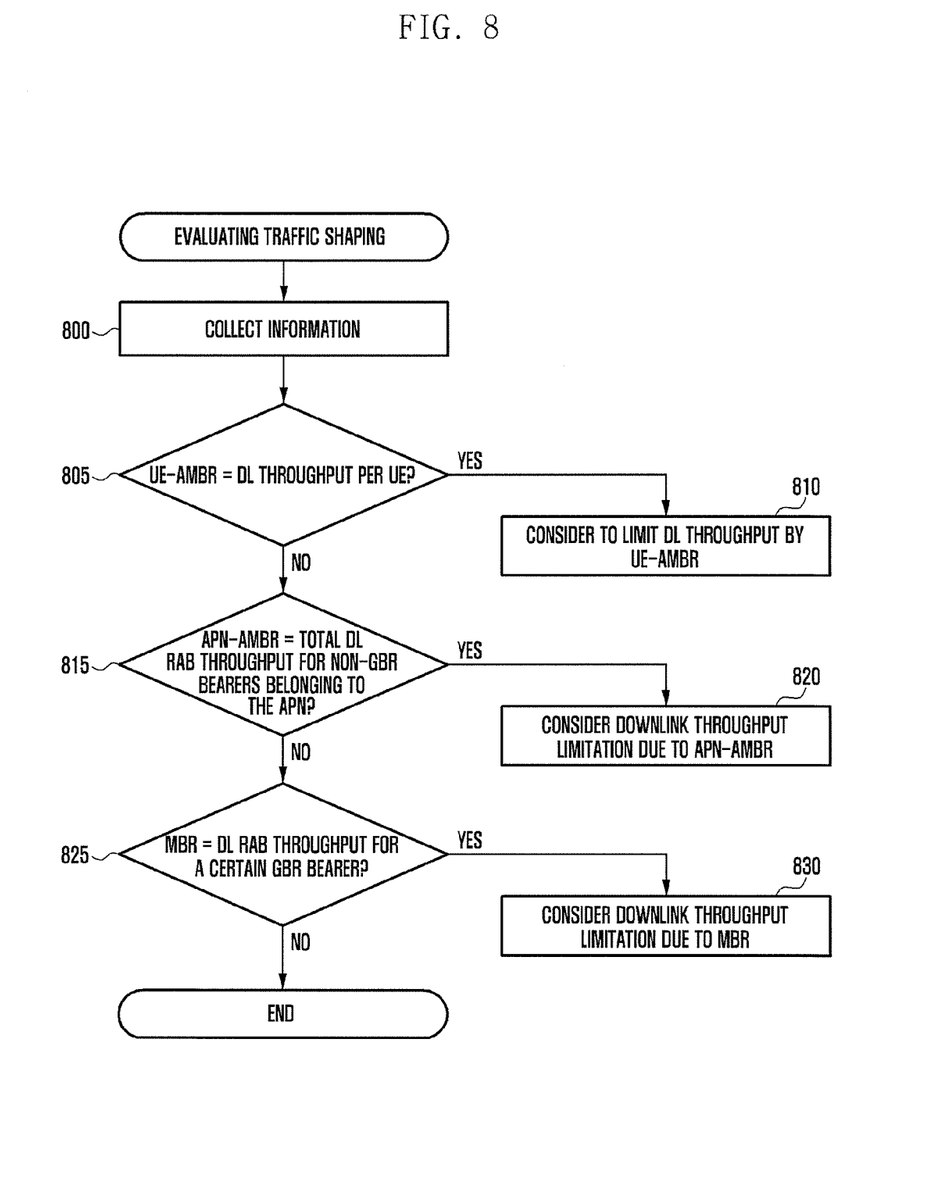
FIG. 8 illustrates a procedure to identify causes for throughput restrictions.

FIG. 8 is a flowchart of a procedure performed by the TCE server to identify causes for throughput restrictions.

At step 800, the TCE server collects information (e.g. per-UE downlink throughput, per-RAB downlink throughput, QCI for each RAB, APN-AMBR, UE-AMBR, MBR per RAB, and APN information for each RAB from the eNB or MME). At step 805, the TCE server checks whether UE-AMBR is equal to per-UE downlink throughput. If UE-AMBR is equal to per-UE downlink throughput, at step 810, the TCE server regards per-UE downlink throughput as being limited by UE-AMBR.

If UE-AMBR is not equal to per-UE downlink throughput, at step 815, the TCE server checks whether APN-AMBR is equal to per-APN downlink throughput. If APN-AMBR is equal to per-APN downlink throughput, at step 820, the TCE server regards per-APN downlink throughput as being limited by APN-AMBR.

If APN-AMBR is not equal to per-APN downlink throughput, at step 825, the TCE server checks whether MBR is equal to downlink throughput of a GBR bearer. If MBR is equal to downlink throughput of a GBR bearer, at step 830, the TCE server regards downlink throughput of the GBR bearer as being limited by MBR.

Figure 9:
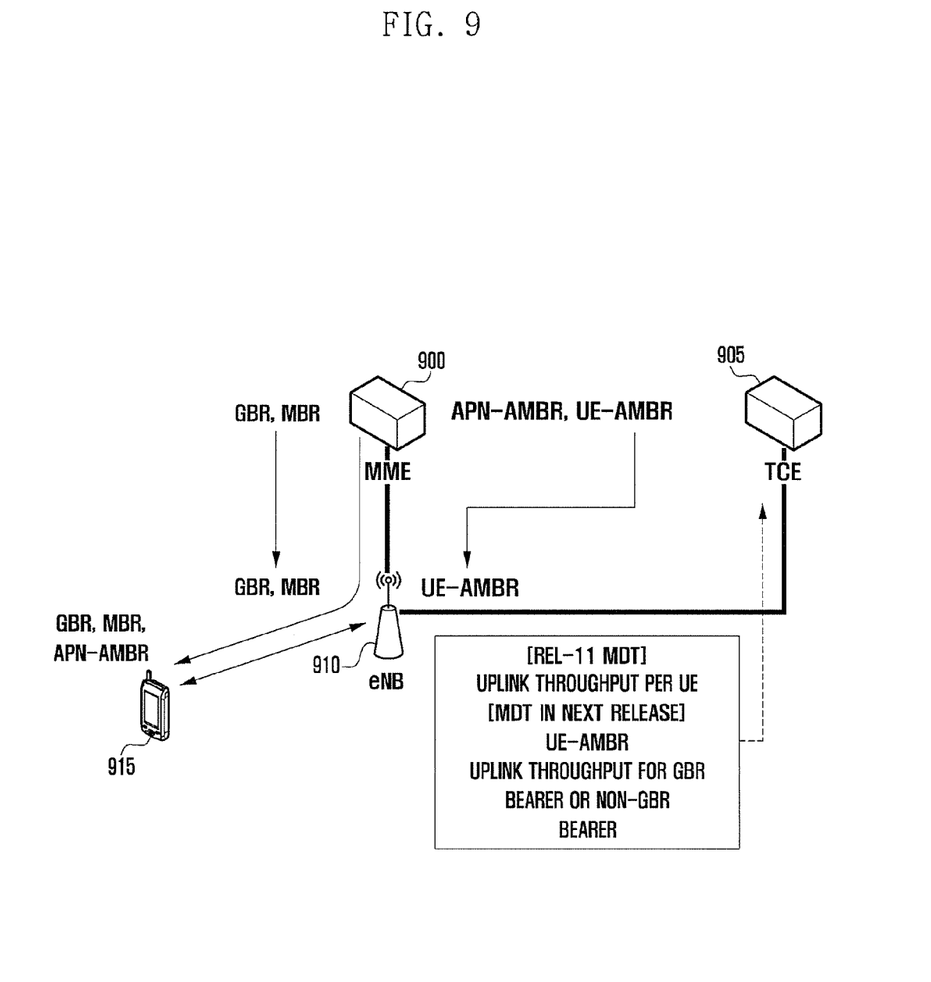
FIG. 9 illustrates identification of restrictions on uplink throughput placed by UE subscription parameters.

FIG. 9 illustrates identification of restrictions on uplink throughput placed by UE subscription parameters.

According to the current LTE standards, in the case of uplink, unlike the case of downlink, the throughput information collected by the eNB is restrictive. That is, the eNB collects information on per-UE throughput only. The per-UE throughput is summed over all bearers without distinction of GBR and non-GBR bearers.

In the present invention, the eNB 910 records UE-AMBR from the MME 900, records collected information on per-UE uplink throughput separately for GBR and non-GBR bearers, and provides the recorded information to the TCE server 905. Thereby, the TCE server may compare the total amount of throughput for non-GBR bearers with UE-AMBR to identify whether throughput associated with non-GBR bearers is limited by UE-AMBR.

Figure 10:
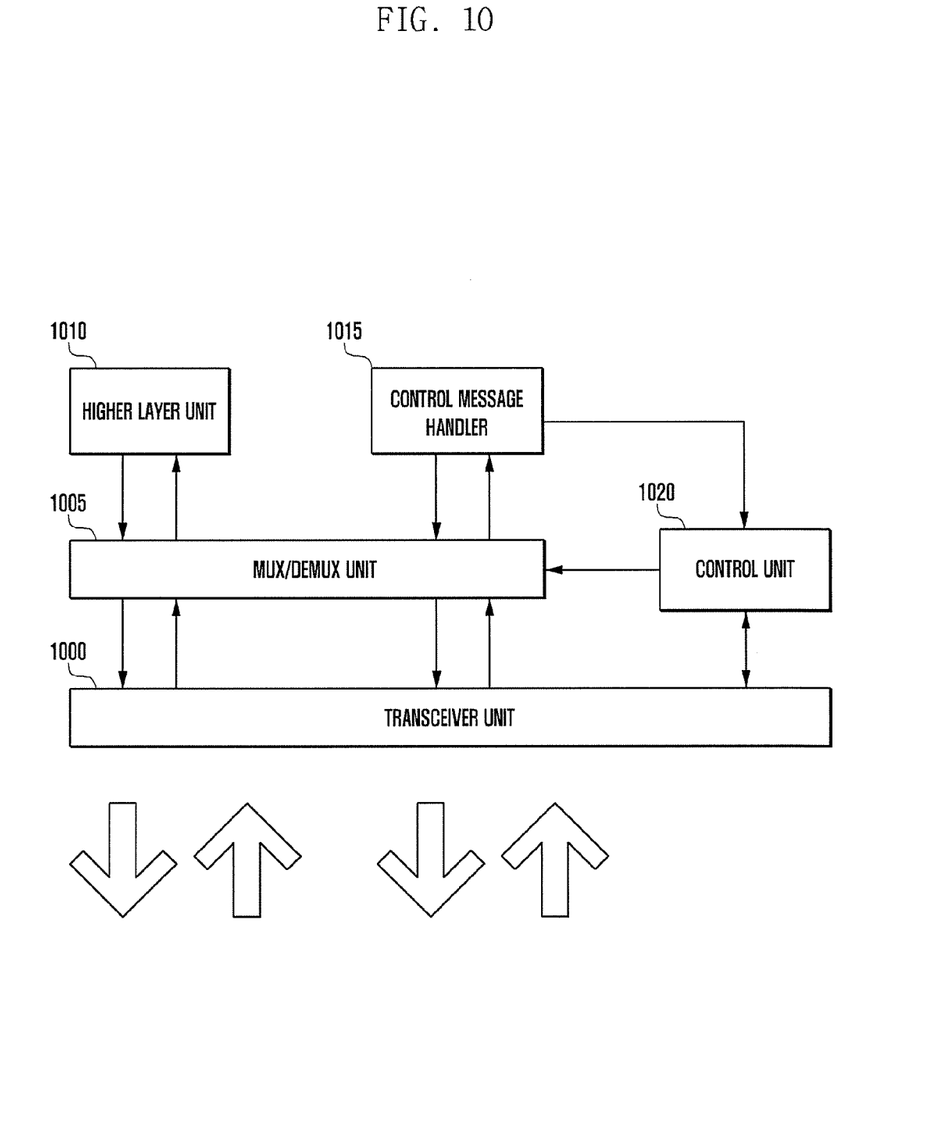
FIG. 10 is a block diagram of a user equipment.

FIG. 10 is a block diagram of a user equipment according to an embodiment of the present invention.

In the UE, the higher layer unit 1010 is used for transmission and reception of data, and the control message handler 1015 is used for transmission and reception of control messages. For transmission of a control signal or data to the base station, under control of the control unit 1020, data and messages are multiplexed through the mux/demux unit 1005 and the multiplexed data is sent through the transceiver unit 1000. For reception, under control of the control unit 1020, physical layer signals are received through the transceiver unit 1000, the received signals are demultiplexed through the mux/demux unit 1005, and the demultiplexed signals are forwarded to the higher layer unit 1010 or the control message handler 1015 according to their contents.

More specifically, the control unit 1020 may receive configuration information for SR transmission information from the eNB, and send, when data to be sent is generated, a scheduling request to the eNB. When scheduling information is not received from the eNB within a preset time duration, the control unit 1020 may resend the scheduling request to the eNB and record information on SR transmission. When scheduling information is received from the eNB, the control unit 1020 may send the recorded SR transmission information to the eNB in accordance with the scheduling information.

In the above description, the UE is depicted as including multiple blocks having distinct functions. However, the present invention is not limited thereto. For example, the function of the mux/demux unit 1005 may be performed directly by the control unit 1020.

Figure 11:
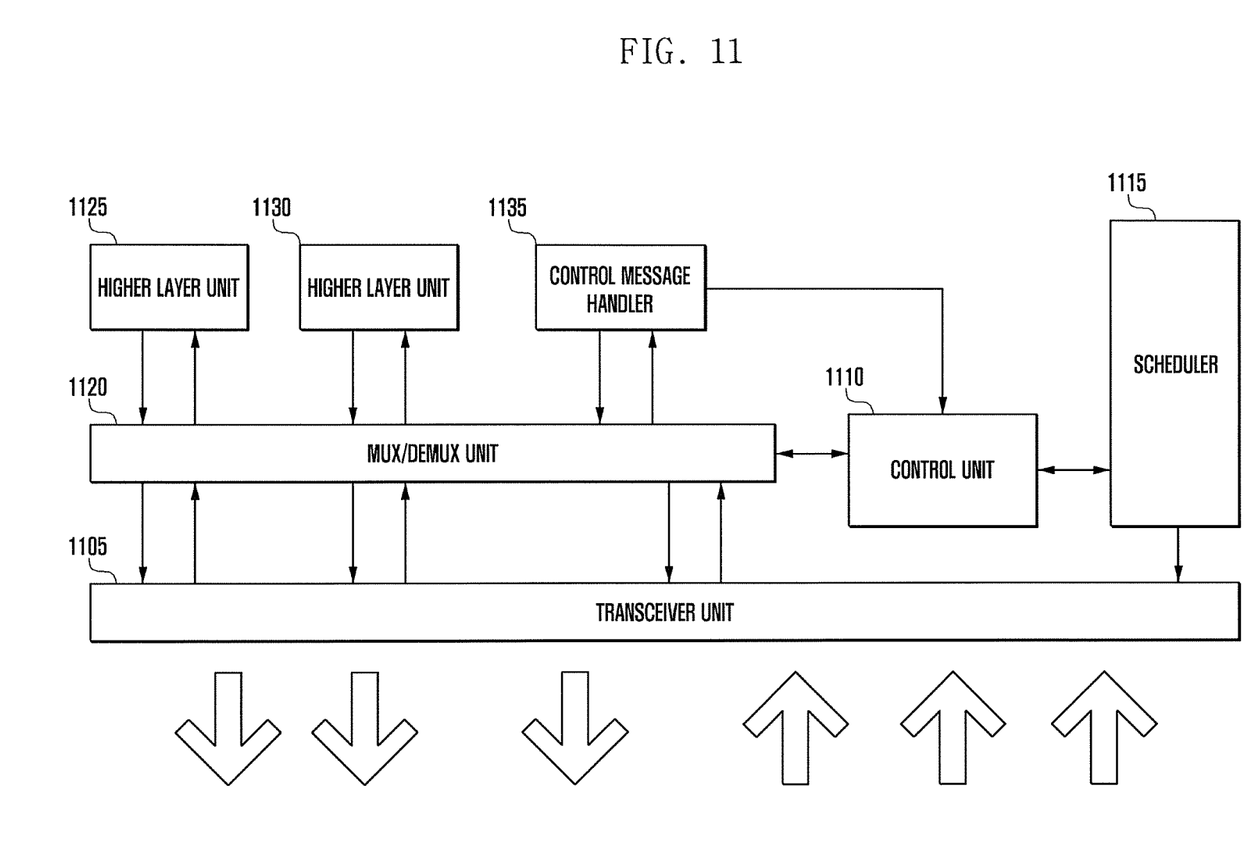
FIG. 11 is a block diagram of a base station.

FIG. 11 is a block diagram of a base station according to an embodiment of the present invention.

As shown in FIG. 11, the eNB may include a transceiver unit 1105, a control unit 1110, a mux/demux unit 1120, a control message handler 1135, various higher layer units 1125 and 1130, and a scheduler 1115.

The transceiver unit 1105 sends data and control signals through a downlink carrier and receives data and control signals through an uplink carrier. When multiple carriers are configured, the transceiver unit 1105 may send and receive data and control signals through the multiple carriers.

The mux/demux unit 1120 multiplexes data coming from the higher layer units 1125 and 1130 or the control message handler 1135, and demultiplexes data received by the transceiver unit 1105 and forwards the demultiplexed data to the higher layer units 1125 and 1130, the control message handler 1135 or the control unit 1110. The control message handler 1135 processes a control message received from a UE and performs a corresponding operation, and generates a control message to be sent to a UE and forwards the control message to a lower layer.

The higher layer units 1125 and 1130 may be configured on a UE basis or on a service basis. The higher layer units 1125 and 1130 may process user data generated by service applications such as File Transfer Protocol (FTP) and Voice over Internet Protocol (VoIP) and forward the processed user data to the mux/demux unit 1120, and may process data from the mux/demux unit 1120 and forward the processed data to appropriate service applications at the higher layer.

The control unit 1110 controls the transceiver unit 1105 in consideration of MBMS transmission timings of UEs. In particular, the control unit 1110 may control a process of sending configuration information for SR transmission information to a UE, sending, when a scheduling request is received from the UE, scheduling information to the UE, and receiving SR transmission information from the UE.

The scheduler 1115 allocates transmission resources to a UE at appropriate points in time in consideration of buffer states, channel states and active times of the UE, and controls the transceiver unit 1105 to send or receive a signal to or from the UE.

In the above description, the eNB is depicted as including multiple blocks having distinct functions. However, the present invention is not limited thereto. For example, the function of the mux/demux unit 1120 may be performed directly by the control unit 1110.

Hereinabove, exemplary embodiments of the present invention have been described with reference to the accompanying drawings. Specific terms or words used in the description should be construed in accordance with the spirit of the present invention without limiting the subject matter thereof. It should be understood that many variations and modifications of the basic inventive concept described herein will still fall within the spirit and scope of the present invention as defined in the appended claims and their equivalents.

The invention claimed is:

1. A method by a terminal for transmitting a scheduling request (SR) in a wireless communication system, the method comprising:
   receiving configuration information for triggering a record of a SR transmission related information from a base station;
   transmitting, if data to be transmitted is generated and if an uplink resource is not allocated, the SR to the base station;
   retransmitting, if scheduling information is not received from the base station, the SR to the base station, and recording the SR transmission related information based on the configuration information; and
   transmitting, if the scheduling information is received from the base station, the SR transmission related information to the base station based on the scheduling information.

2. The method of claim 1, wherein the SR transmission related information comprises information regarding at least one of a number of SR transmission attempts, a random access fallback, physical uplink control channel (PUCCH) transmission power, terminal power headroom, one or more timestamps, or a terminal location.

3. The method of claim 1, wherein transmitting the SR transmission related information comprises transmitting a Medium Access Control-Control Element (MAC CE) containing the SR transmission related information to the base station.

4. The method of claim 1, wherein transmitting the SR transmission related information comprises transmitting a measurement report message containing the SR transmission related information to the base station.

5. The method of claim 1, wherein transmitting the SR transmission related information comprises:

transmitting a higher layer message indicating a presence of recorded SR transmission related information to the base station;

receiving a terminal information request message requesting SR transmission related information from the base station; and transmitting a terminal information response message containing the SR transmission related information to the base station.

6. A terminal configured to transmit a scheduling request (SR) in a wireless communication system, the terminal comprising:

a transceiver configured to transmit and receive signals to and from a base station; and a controller configured to:

receive configuration information for triggering a record of a SR transmission related information from the base station, transmit, if data to be transmitted is generated and if an uplink resource is not allocated, the SR to the base station, retransmit, if scheduling information is not received from the base station, the SR to the base station, record SR transmission related information based on the configuration information, and transmit, if the scheduling information is received from the base station, the SR transmission related information to the base station based on the scheduling information.

7. The terminal of claim 6, wherein the SR transmission related information comprises information regarding at least one of a number of SR transmission attempts, a random access fallback, physical uplink control channel (PUCCH) transmission power, terminal power headroom, one or more timestamps, or a terminal location.

8. The terminal of claim 6, wherein the controller is configured to control a transmission of a Medium Access Control-Control Element (MAC CE) containing the SR transmission related information to the base station.

9. The terminal of claim 6, wherein the controller is configured to control a transmission of a measurement report message containing the SR transmission related information to the base station.

10. The terminal of claim 6, wherein the controller is configured to control a process of:

transmitting a higher layer message indicating a presence of recorded SR transmission related information to the base station, receiving a terminal information request message requesting SR transmission related information from the base station, and transmitting a terminal information response message containing the SR transmission related information to the base station.

11. A method by a base station for receiving a scheduling request (SR) in a wireless communication system, the method comprising:

transmitting configuration information for triggering a record of a SR transmission related information to a terminal;

transmitting, if the SR is received from the terminal, scheduling information to the terminal; and receiving the SR transmission related information transmitted based on the scheduling information from the terminal, wherein the SR transmission related information is recorded based on the configuration information.

12. The method of claim 11, wherein the SR transmission related information comprises information regarding at least one of a number of SR transmission attempts, a random access fallback, physical uplink control channel (PUCCH) transmission power, terminal power headroom, one or more timestamps, or a terminal location.

13. The method of claim 11, wherein receiving the SR transmission related information comprises receiving a Medium Access Control-Control Element (MAC CE) containing the SR transmission related information.

14. The method of claim 11, wherein receiving the SR transmission related information comprises receiving a measurement report message containing the SR transmission related information.

15. The method of claim 11, wherein receiving the SR transmission related information comprises:

receiving a higher layer message indicating a presence of recorded SR transmission related information from the terminal;

transmitting a terminal information request message requesting SR transmission related information to the terminal; and receiving a terminal information response message containing the SR transmission related information from the terminal.

16. A base station configured to receive a scheduling request (SR) in a wireless communication system, the base station comprising:

a transceiver configured to transmit and receive signals to and from a terminal; and a controller configured to control a process of:

transmitting configuration information for triggering a record of a SR transmission related information to the terminal, transmitting, when the SR is received from the terminal, scheduling information to the terminal, and receiving the SR transmission related information transmitted based on the scheduling information from the terminal, wherein the SR transmission related information is recorded on the configuration information.

17. The base station of claim 16, wherein the SR transmission related information comprises information regarding at least one of a number of SR transmission attempts, a random access fallback, physical uplink control channel (PUCCH) transmission power, terminal power headroom, one or more timestamps, or a terminal location.

18. The base station of claim 16, wherein the controller is configured to receive a Medium Access Control-Control Element (MAC CE) containing the SR transmission related information.

19. The base station of claim 16, wherein the controller is configured to receive a measurement report message containing the SR transmission related information.

20. The base station of claim 16, wherein the controller is configured to control a process of:

receiving a higher layer message indicating presence of recorded SR transmission related information from the terminal, transmitting a terminal information request message requesting SR transmission related information to the terminal, and receiving a terminal information response message containing the SR transmission related information from the terminal.

* * * * *